United States Patent [19]

Fercher et al.

[11] Patent Number: 4,652,131

[45] Date of Patent: Mar. 24, 1987

[54] METHOD AND APPARATUS FOR MAKING A CONTACT-FREE MEASUREMENT OF THE ACTUAL POSITION AND OF THE PROFILE OF A COARSE SURFACE

[75] Inventors: Adolf F. Fercher, Essen, Fed. Rep. of Germany; Hong Z. Hu, University Tientsin, China

[73] Assignee: Carl-Zeiss-Stiftung, Heidenheim, Fed. Rep. of Germany

[21] Appl. No.: 693,530

[22] Filed: Jan. 22, 1985

Related U.S. Application Data

[60] Continuation of PCT EP 84/00152, May 19, 1984, published as WO 84/04810 Dec. 6, 1984, abandoned.

[30] Foreign Application Priority Data

May 21, 1983 [DE] Fed. Rep. of Germany ....... 3318678

[51] Int. Cl.$^4$ .............................................. G01B 9/02
[52] U.S. Cl. .................................... 356/349; 356/354; 356/359
[58] Field of Search ................ 356/357, 349, 358–360, 356/371, 5, 376, 4.5, 354, 355, 356; 250/226, 237 R

[56] References Cited

U.S. PATENT DOCUMENTS

| | | | |
|---|---|---|---|
| 3,225,177 | 12/1965 | Stites et al. ..................... | 250/226 R |
| 3,647,302 | 3/1972 | Zipin et al. ........................ | 356/349 |
| 4,005,936 | 2/1977 | Redman et al. ................ | 356/349 X |
| 4,086,808 | 5/1978 | Camac et al. ................... | 356/349 X |

OTHER PUBLICATIONS

Dandliker et al., "Measuring Microvibrations by Heterodyne Speckle Interferometry", Optics Letters, vol. 6, No. 4, Apr. 1981, pp. 165–167.

Jones et al., "Holographic and Speckle Interferometry" Cambridge University Press, 1983, pp. 51–61, 198–239.

Primary Examiner—Vincent P. McGraw
Assistant Examiner—Matthew W. Koren
Attorney, Agent, or Firm—Walter Ottesen

[57] ABSTRACT

The invention is directed to a method and apparatus for the contact-free measurement of the actual position and/or of the profile of coarse surfaces. Laser light generated by a laser has at least two different wavelengths and is directed to the surface to be measured. A beam splitter is placed between the surface to be measured and the laser to split the laser light into a reference beam and a measuring beam. The reference beam is reflected on a reference plane surface. A speckle pattern is formed in the interferogram plane of the reflected light. From the speckle pattern, a bright laser speckle is selected for all wavelengths by means of a measuring diaphragm having a diameter less than that of a laser speckle. Behind the measuring diaphragm, the two wavelenths are separated from each other and the phase difference between the signals of the different wavelengths is measured. The phase difference is transformed into a signal proportional to the distance between the measuring point and the reference surface and is displayed. The reference light beam can be shifted in frequency with respect to the measuring beam by means of a heterodyne device.

12 Claims, 4 Drawing Figures

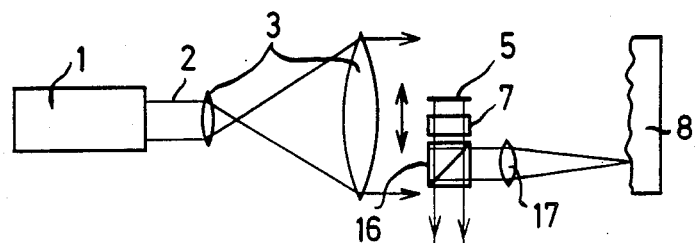
Fig. 3
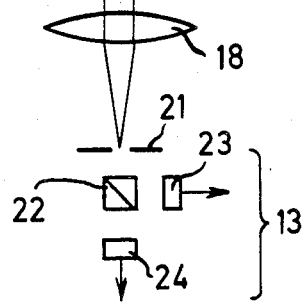
Fig. 4
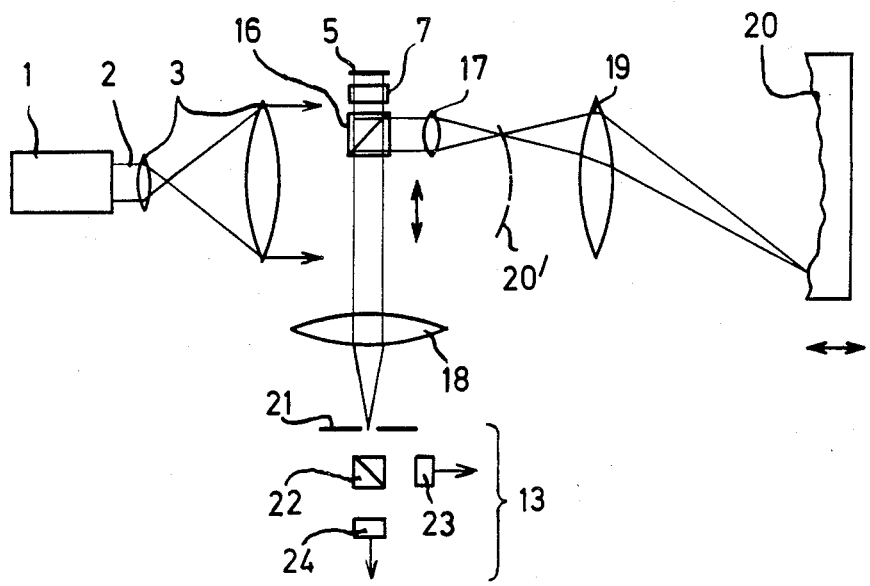

METHOD AND APPARATUS FOR MAKING A CONTACT-FREE MEASUREMENT OF THE ACTUAL POSITION AND OF THE PROFILE OF A COARSE SURFACE

RELATED APPLICATIONS

This is a continuation application of our International patent application PCT/EP84/00152 filed in the European Patent Office on May 19, 1984 with priority claimed from German patent application P 33 18 678.2 filed in the Federal Republic of Germany on May 21, 1983.

BACKGROUND OF THE INVENTION

Various methods for the contact-free measurement of surfaces are known. In most of these methods, the light generated by the laser is focused in the desired position of the surface and the light reflected from this surface is conducted to a receiver which measures the intensity of the light. The light intensity is at its highest when the surface takes on its desired position. In order to establish a certain measuring region around the desired position, it is known to axially move a diaphragm periodically which is arranged in front of the receiver as disclosed in the article entitled "Photoelectric Detection of Displacement from Focus" in Applied Optics, Volume 5, Number 12, (1966), pages 1061 and 1062 or, the focusing range of the lens that images the laser light can be axially expanded as disclosed in "Feinwerktechnik & MeBtechnik 84", Book 2, (1976), pages 72 to 74. With these methods, a scanning as well as a profile measurement of the surface is possible; however, the achieved accuracy is insufficient for many applications.

Holography is another method for the contact-free measurement of the form of a surface and is disclosed in an article entitled "Testing Aspherics Using Two-Wavelength Holography" in Applied Optics, Volume 10, Number 9, (1971), pages 2113 to 2118. Here, an interferogram of the object to be examined is generated and retained photographically and placed in the measuring arrangement as a hologram. Measurements are then made with a light of a second wavelength and the object to be examined remains in the beam path. In this way, an interferogram is made that makes possible a very precise evaluation. However, this method has the disadvantage that work in real time cannot be carried out.

An attempt has already been made to measure rough surfaces interferometrically. For this, radiation having a wavelength of 10.6 μm was utilized. In a Twyman-Green interferometer, interference strips are thereby generated having a contrast which becomes poorer with increasing surface roughness. In this connection, reference may be had to the article entitled "Rough Surface Interferometry at 10.6 μm" appearing in Applied Optics, Volume 19, Number 11, (1980), pages 1863 to 1869. This method has the disadvantage that it functions with invisible radiation so that the adjustment of the interferometer is very complex and difficult.

SUMMARY OF THE INVENTION

It is an object of the invention to provide a method of making contact-free measurements of rough surfaces which makes possible a very precise measurement of high position resolution in real time utilizing light. It is a further object of the invention to provide a suitable apparatus for carrying out the method of the invention.

In contrast to the previously held view, such an interferometric method does indeed provide a purposeful and very accurate result since the individual measurement on points is smaller or of the same size as the laser speckle occurring in the interferogram plane. A speckle pattern appears as an uneven distribution of small bright spots (speckles) which are separated from each other by darker regions. This distribution is constant as to time and space so long as no movement occurs between the object and the laser light. The bright speckles define coherence regions within which the interferometric relationships are definite and measurable. The most important characteristics of speckle patterns are described in the book entitled "Laser-Speckle" of J. C. Dainty, Springer-Verlag, Berlin, Heidelberg, New York, (1975).

By means of the selection of the wavelengths of the laser light used, the region can be established within which the spacing of the measuring points in question from a reference surface can be clearly measured. If a surface is to be measured which has unevenness within a predetermined region, the method according to the invention can be carried out with two correspondingly selected wavelengths. If surfaces with large profile elevation differences between scanning points are to be measured, the measuring region can be effectively widened by utilizing three wavelengths. If the problem to be solved requires it, still additional wavelengths in suitable form can be utilized.

The measurement utilizing several wavelengths can be conducted simultaneously or also sequentially.

It is especially advantageous to measure the phase differences in the measuring field according to the so-called heterodyne method. For this, the light in the reference beam path for all wavelengths utilized is displaced in its frequency with respect to the measuring beam path by an amount corresponding to the heterodyne frequency. A complete explanation of the heterodyne method is disclosed in the article entitled "High-Performance Real-Time Heterodyne Interferometry" in Applied Optics, Volume 18, Number 11, (1979), pages 1797 to 1803.

In this apparatus, the interferogram plane wherein the speckle pattern occurs lies conjugated to the surface of the object to be measured so as to facilitate imaging. It can be advantageous not to arrange the measuring diaphragm directly in the interferogram plane; instead, it can be somewhat defocused, that is, it can be arranged outside of this plane. In this case, a larger surface region contributes to the light passing through the measuring diaphragm. The phase difference measurement then provides an averaged profile elevation over this surface region of the object to be measured. In this way, the measuring method becomes relatively insensitive to defocusing so that continuous follow-up focusing is not necessary, for example, with a curved object surface.

The method according to the invention makes it possible to make measurements of rough surfaces in the manufacture of machinery with interferometric accuracy. This method can be utilized also for high-precision contact of arbitrarily selected surfaces. This is advantageous compared to the state-of-the-art of contact technology with mechanical contact especially with respect to soft materials or where the contact is to take place very quickly.

The method of the invention makes it possible, for example, to measure nonpolished optical surfaces with the same apparatus as is utilized to measure polished surfaces. Since in manufacture, every optical surface has microscopic roughness before polishing, such a method is of special significance for optics technology. It is also an important step for an automatic method for producing differently formed optical surfaces.

BRIEF DESCRIPTION OF THE DRAWING

The invention will now be described with reference to the drawing wherein:

FIG. 3 is still another embodiment of the apparatus according to the invention which serves to measure the profile of a surface; and, FIG. 4 illustrates the apparatus according to FIG. 3 in its application to measuring the profile of a large curved surface.

DESCRIPTION OF THE PREFERRED EMBODIMENTS OF THE INVENTION

Figure 1:
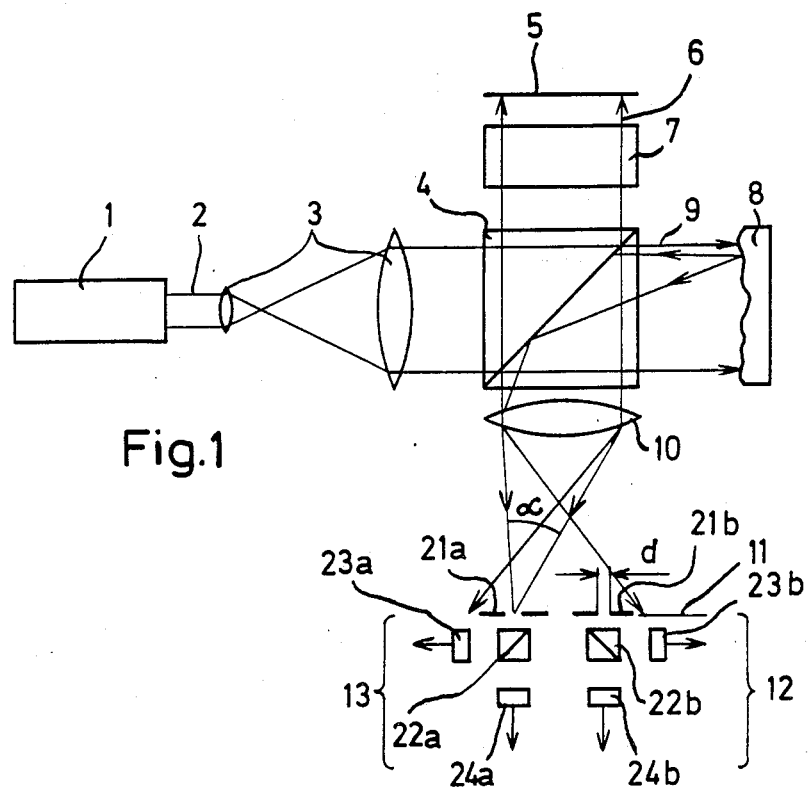
FIG. 1 is a schematic representation of the apparatus according to the invention which serves to explain the measuring principle.

In FIG. 1, reference numeral 1 indicates a laser which emits light of two different wavelengths $\lambda_1$ and $\lambda_2$. The laser light 2 is widened by means of lenses 3 and impinges as a parallel beam on the beam-splitter 4. The beam-splitter 4 splits the laser light 2 into a reference beam path 6 and a measuring beam path 9. The measuring beam path 9 impinges on the surface of the object 8 to be measured. The reference beam path 6 impinges on the flat reference surface 5 which can, for example, be configured as a mirror. The light reflected from the surfaces 5 and 8 is unified in the beam-splitter 4 and, with the aid of lens 10, is focused in the interferogram plane 11 which is conjugated to the reference plane 5.

In the method of the invention for measuring rough surfaces, no conventional interferogram occurs in the interferogram plane 11; instead, a speckle pattern occurs. In the interferogram plane 11 there are two measuring diaphragms 21a and 21b arranged having respective diameters d smaller than a mean speckle diameter s which has approximately the magnitude $s = \lambda/\alpha$.

In the apparatus of FIG. 1, an arrangement 7 is disposed between the beam-splitter 4 and the reference surface 5 which displaces the frequency of both wavelengths in the reference bundle 6 with respect to the measuring bundle 9 by the so-called heterodyne frequency. There are many suitable methods known from the state-of-the-art for shifting frequency and one of these methods is disclosed in the above-mentioned article entitled "High-Performance Real-Time Heterodyne Interferometry". The phase to be measured is then in the signal having the heterodyne frequency so that the measurement is simplified.

The light passing through the measuring diaphragms 21a and 21b falls on two dichromatic beam-splitter cubes 22a, 22b which split the light into the wavelength components. The light of the first wavelength $\lambda_1$ impinges, for example, on the two receivers 23a and 23b; whereas, the light of the second wavelength $\lambda_2$ impinges on the two receivers 24a and 24b.

The detector system 12 comprising beam-splitter 22b and both receivers 23b and 24b is stationary and delivers the reference signals S1R and S2R. The detector system 13 comprises the beam-splitter 22a and both receivers 23a and 24a. The detector system 13 is movable and together with the diaphragm 21a scans the interferogram plane. In this way, both receivers deliver the measuring signals S1M and S2M. The signals delivered by both detector systems 12 and 13 are supplied to a lock-in amplifier and, from there, are conducted to a computer which determines and displays the actual measuring signal. To provide a better overview, the amplifier and computer are not shown in FIG. 1; however, their arrangement is the same as shown for the amplifier 25 and computer 26 in the schematic of FIG. 2.

Since, with the apparatus of FIG. 1, a speckle pattern rather than a conventional interferogram occurs in the interferogram plane 11, the measurement is carried out with the aid of laser speckle pairs each consisting of a laser speckle of the wavelengths $\lambda_1$ and $\lambda_2$. For making actual measurements, only speckle pairs which occur at the same location on the surface of the object 8 are utilized to determine the measuring signal. The two measuring diaphragms 21a and 21b have respective diameters d less than a mean speckle diameter s and serve to select the laser speckle pairs. Measuring data is taken only from such points whereat a bright laser speckle is present for both wavelengths $\lambda_1$ and $\lambda_2$. No measurement occurs if this condition is not fulfilled. If the lock-in amplifier connected in cascade to receivers 23 and 24 is driven in the phase-measuring mode suitable for the problem at hand, it will automatically provide a warning signal if no bright laser speckles lie on the measuring diaphragms.

For making the actual measurement, the phase difference $\Delta\phi$ of the reference signals S1R and S2R is first determined as the difference of the phases $\phi_1$ and $\phi_2$ of the interferogram of $\lambda_1$ and $\lambda_2$ in the laser speckle of the reference point detected by the measuring diaphragm 21b. The measuring point is determined by means of the measuring diaphragm 21a which, in effect, scans the surface of the object 8 with its movement in the interferogram plane 11. The phases in the measuring point are therefore defined by the following equations:

$$\psi_1 = \phi_1 + \frac{2\pi}{\lambda_1} \cdot h$$

$$\psi_2 = \phi_2 + \frac{2\pi}{\lambda_2} \cdot h$$

wherein h is the additional path difference between the object light and the reference light in the measuring point in question and compared with the path difference in the reference point. The symbol h thereby describes the surface profile of the measured object referred to the reference mirror 5. The difference $\Delta\psi = \psi_1 - \psi_2$ of interferogram phases in the measuring point is determined from an evaluation of signals S1M and S2M. Therefore, $\Delta\psi$ is given by the following:

$$\Delta\psi = \Delta\phi + 2\pi \cdot \frac{\lambda_2 - \lambda_1}{\lambda_1 \lambda_2} \cdot h$$

The profile elevation h can be clearly determined from this equation in a computer 26 so long as between neighboring points h is not greater than:

$$\frac{\lambda_1 \lambda_2}{|\lambda_2 - \lambda_1|}$$

If h is greater, then this profile elevation remains undetermined up to a multiple of the last mentioned expression.

Through a selection of the wavelengths $\lambda_1$ and $\lambda_2$, the method can be adapted to the expected unevenness of the surface of the measured object 8.

The measuring method with two wavelengths described in connection with FIG. 1 provides useful values for the surface profile h of the measured object 8 when scanning the rough surface so long as $\Delta\psi$ changes less than $\pm\pi$ from scanning point to scanning point. The reason for this is that $\Delta\psi$ is only measurable up to the multiple of $2\pi$. By including a third wavelength $\lambda_3$, the measuring range of the method can be very effectively widened to large profile elevation differences between the scanning points. For the third wavelength $\lambda_3$, the following equation applies:

$$\frac{\lambda_1 \cdot \lambda_3}{|\lambda_3 - \lambda_1|} > \frac{\lambda_1 \cdot \lambda_2}{|\lambda_2 - \lambda_1|}$$

In the event that it is required, still further additional wavelengths can be utilized in suitable combinations in correspondence to the measuring task at hand. In this connection, it is necessary that at least one wavelength lies in the visible spectral region for the simplification of the adjustment and of the measuring procedure.

The apparatus according to FIG. 1 provides only very weak measuring signals since the total surface of the measured object 8 is illuminated with the measuring beam 9. As mentioned above, FIG. 1 serves primarily to explain the measuring principle.

Figure 2:
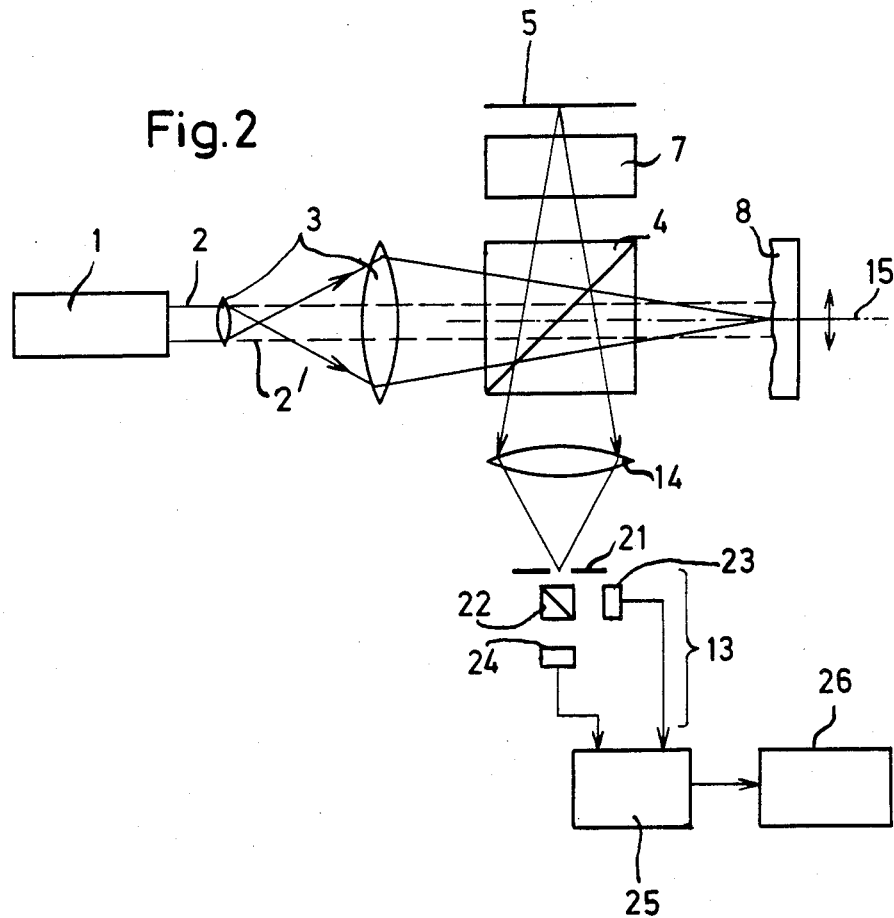
FIG. 2 is a further embodiment of the apparatus according to the invention.

In the apparatus according to FIG. 2, the lens system 3 is so configured that the laser beam 2 is focused on one point of the surface of the measured object 8. This point is the instantaneous measuring point. A lens 14 is arranged between the beam-splitter 4 and the measuring diaphragm 21 and images the light reflected from the reference mirror 5 and from the surface of the object 8 in the measuring diaphragm 21. Measuring diaphragm 21 is stationary; whereas, the object 8 is moved in the direction of the double arrow for measuring the surface profile.

In addition to measuring the surface profiles, the apparatus illustrated in FIG. 2 is suitable also for contacting of desired surfaces, that is, to determine the position of the surface of an object 8 on the optical axis 15 of the apparatus.

Since one is mostly interested only in the course of the surface profile relative to a reference surface and because the phase difference $\Delta\phi$ in the reference point remains constant, the measurement in the reference point and therefore the detector group 12 in FIG. 1 can be omitted and this is the situation in FIG. 2.

The light passing through the measuring diaphragm 21 is split up by the beam-splitter 22 into light of the two wavelengths whereby the light of the individual wavelengths impinges upon both receivers 23 and 24. The signal generated by the receivers 23 and 24 is conducted to a lock-in amplifier 25 which measures the phase difference $\Delta\psi$. This signal is processed to the actual measuring signal in the computer 26.

A second detector group 13 is omitted in the apparatus of FIG. 2 so that the course of the surface profile of the object 8 can be measured relative to a reference surface. When surfaces are measured, which for example get into the mirror-reflective condition during processing, it can be purposeful to retain at least one of the receivers of the detector group 12 because measurements can continue to be made in this case with the known heterodyne interferometry, with the same apparatus and with very high interferometric measuring precision.

As mentioned above, the interferogram plane 11 wherein the measuring diaphragm 21 is arranged, lies conjugated in an imaging manner to the surface of the object 8 to be measured. For certain applications, the measuring diaphragm 21 can be arranged somewhat outside of the interferogram plane 11. In this situation, a larger surface region of the measured object 8 contributes to the light registered by the measuring diaphragm 21. The phase measurement then provides a profile elevation h averaged over this surface region of the measured object 8. In this way, the measuring method described above is relatively insensitive to defocusing so that, for example, with curved object surfaces it is not necessary to continuously refocus. On the other hand, such an averaging with a defocused imaging scan can be of interest with respect to special situations.

A substantial improvement with respect to the use of energy is achieved compared to the apparatus of FIG. 1 in that the beam expansion system 3 is omitted. This case is shown with broken lines in FIG. 2. Here, the unexpanded laser beam 2' illuminates the object 8 to be measured.

With large objects 8, a precise displacement thereof with respect to the measuring apparatus can become problematical. In such cases, the apparatus of FIG. 3 provides a purposeful alternative. In the apparatus of FIG. 3, a smaller beam-splitter 16 is utilized which, together with the heterodyne arrangement 7, the reference mirror 5 and a focusing lens 17 performs the two-dimensional scan movement which can run in the plane of the drawing and perpendicularly to the latter. The object 8 itself remains either stationary or can be refocused to the surface macroscopically. A lens 18 focuses the measuring light onto the measuring diaphragm 21 of the detector system 13. Since the diameter of the lens 17 is substantially less than that of the lens of the beam expansion system 3, there occurs here a loss of energy when compared to the apparatus of FIG. 2; however, this energy loss is significantly less than that associated with the apparatus of FIG. 1.

For measuring surfaces that extend beyond the scanning region, a reduced image of the surface of the measured object can be scanned and, in the opposite situation, an enlarged image of the measured object surface can be scanned.

An alternate embodiment of the apparatus according to the invention is shown in FIG. 4 which is utilized to measure a concave surface 20 that extends beyond the scanning region, the latter being fixed by means of the displacement of elements 16, 17, 7 and 5. Reference numeral 19 here indicates the imaging optic which generates a reduced real image 20' of the object surface 20. Measurements then are in effect made in image 20'.

In order to also measure macroscopically curved surfaces, either the object 20, the imaging optic 19 or the focusing optic 17 can be displaced by known amounts in the direction of the optical axis 15. This displacement direction is indicated in FIG. 4 by means of the double arrow beneath the measured object 20.

It is understood that the foregoing description is that of the preferred embodiments of the invention and that various changes and modifications may be made thereto without departing from the spirit and scope of the invention as defined in the appended claims.

What is claimed is:

1. Method for contact-free measurement of an actual position on a surface, the method comprising the steps of:
   (a) splitting a laser light having at least two different wavelengths into a reference beam directed along a reference beam path onto an even reference surface and a measuring beam directed along a measuring beam path onto the surface to be measured;
   (b) focussing the light reflected from said surfaces into an interferogram plane whereat a speckle pattern occurs containing bright speckles which are bright for all of said wavelengths;
   (c) selecting one of said bright speckles corresponding to a measuring point on the surface;
   (d) generating signals corresponding to respective ones of said wavelengths for the selected bright speckle;
   (e) measuring the difference in phase between said signals corresponding to said selected bright speckle; and,
   (f) converting said difference in phase into a signal proportional to the distance h of the measuring point from said reference surface.

2. The method of claim 1, wherein light having three wavelengths is utilized in said measuring step.

3. The method of claim 1, the measurement utilizing various wavelengths being conducted simultaneously.

4. The method of claim 1, the measurement utilizing various wavelengths being conducted sequentially.

5. The method of claim 1, comprising the further steps of displacing the frequency of the light in said reference beam path and of making the measurement with the heterodyne frequency occurring thereby.

6. The method of claim 1, comprising the further step of focusing said measureing beam onto said surface to be measured.

7. The method of claim 1, the further step of displacing said surface to be measured relative to said measuring beam.

8. Apparatus for making a contact-free measurement of the actual position and of the profile of a rough surface of an object, the apparatus comprising:
   at least one light source for generating a laser light having different wavelengths;
   first beam splitter means disposed between the object and said light source for splitting said laser light into a reference beam directed along a reference beam path and a measuring beam directed along a measuring beam path onto the surface of the object;
   planar reference surface means mounted in said reference beam path for reflecting said reference beam;
   a measuring diaphragm arranged in an interferogram plane wherein a laser speckle pattern occurs containing bright speckles which are bright for all of said wavelengths, said interferogram plane being conjugated to said reference surface means and said measuring diaphragm having a diameter less than the diameter of a bright laser speckle of said laser speckle pattern;
   second beam splitter means arranged behind said measuring diaphragm for splitting said measuring beam corresponding to said bright laser speckle into component beams corresponding to respective ones of said wavelengths;
   a plurality of detectors disposed so as to receive corresponding ones of said component beams for generating respective detector signals; and,
   an arrangement disposed downstream of said detectors for receiving said detector signals and for generating a measuring signal proportional to the difference in phase of said detector signals.

9. The apparatus of claim 8, further comprising phase displacement means disposed in said reference beam path for displacing the frequency of said reference beam by an amount corresponding to a heterodyne frequency; and, said arrangement being configured for measuring said difference in phase in the presence of said heterodyne frequency.

10. The apparatus of claim 8, comprising a focussing lens mounted between said first beam splitter means and the surface of the object, said first beam splitter means, said planar reference surface means and said focussing lens all being displaceable with respect to the object.

11. Apparatus for making a contact-free measurement of the actual position and of the profile of a rough surface of an object, the apparatus comprising:
   at least one light source for generating a laser light having different wavelengths;
   first beam splitter means disposed between the object and said light source for splitting said laser light into a reference beam directed along a reference beam path and a measuring beam directed along a measuring beam path onto the surface of the object;
   planar reference surface means mounted in said reference beam path for reflecting said reference beam;
   a measuring diaphragm arranged outside of an interferogram plane wherein a laser speckle pattern occurs containing bright speckles which are bright for all of said wavelengths, said interferogram plane being conjugated to said reference surface means and said measuring diaphragm having a diameter less than the diameter of a bright laser speckle of said laser speckle pattern;
   second beam splitter means arranged behind said measuring diaphragm for splitting said measuring beam corresponding to said bright laser speckle into component beams corresponding to respective ones of said wavelengths;
   a plurality of detectors disposed so as to receive corresponding ones of said component beams for generating respective detector signals; and,
   an arrangement disposed downstream of said detectors for receiving said detector signals and for generating a measuring signal proportional to the difference in phase of said detector signals.

12. Method for contact-fee measurement of an actual position and of the profile of a rough surface, the method comprising the steps of:
   (a) splitting a laser light having at least two different wavelengths into a reference beam directed along a reference beam path onto an even reference surface and a measuring beam directed along a measuring beam path onto the surface to be measured;
   (b) focussing the light reflected from said surfaces into an interferogram plane whereat a speckle pattern occurs containing bright speckles which are bright for all of said wavelengths;

(c) selecting one of said bright speckles corresponding to a measuring point on the surface;

(d) generating signals corresponding to respective ones of said wavelengths for the selected bright speckle;

(e) measuring the difference in phase between said signals corresponding to said selected bright speckle;

(f) converting said difference in phase into a signal proportional to the distance h of the measuring point from said reference surface; and, (g) selecting other ones of said bright speckles corresponding to other respective measuring points on the surface and repeating said steps (d) to (f).

* * * * *